US006189103B1

(12) United States Patent
Nevarez et al.

(10) Patent No.: US 6,189,103 B1
(45) Date of Patent: Feb. 13, 2001

(54) AUTHORITY DELEGATION WITH SECURE OPERATING SYSTEM QUEUES

(75) Inventors: Carlos A Nevarez, Orem; Grant G Echols, Payson, both of UT (US)

(73) Assignee: Novell, Inc., Provo, UT (US)

( * ) Notice: Under 35 U.S.C. 154(b), the term of this patent shall be extended for 0 days.

(21) Appl. No.: 09/119,896

(22) Filed: Jul. 21, 1998

(51) Int. Cl.[7] .................................................... G06F 11/00

(52) U.S. Cl. .......................................................... 713/201

(58) Field of Search ................................... 713/201, 202, 713/200

(56) References Cited

U.S. PATENT DOCUMENTS

| | | | |
|---|---|---|---|
| 5,349,642 | 9/1994 | Kingdon | 380/25 |
| 5,481,720 * | 1/1996 | Loucks | 713/201 |
| 5,499,358 | 3/1996 | Nevarez | 395/600 |
| 5,628,007 | 5/1997 | Nevarez | 395/612 |
| 5,633,931 | 5/1997 | Wright | 380/25 |
| 5,671,414 | 9/1997 | Nocolet | 395/681 |
| 5,677,851 | 10/1997 | Kingdon et al. | 364/514 C |
| 5,692,129 | 11/1997 | Sonderegger et al. | 395/200.11 |
| 5,737,518 | 4/1998 | Grover et al. | 395/183.14 |
| 5,737,523 * | 4/1998 | Callaghan | 713/201 |
| 5,751,812 * | 5/1998 | Anderson | 713/155 |
| 5,758,069 | 5/1998 | Olsen | 395/187.01 |
| 5,761,499 | 6/1998 | Sonderegger | 395/610 |
| 5,781,724 | 7/1998 | Nevarez et al. | 395/186 |
| 6,061,790 * | 5/2000 | Bodnar | 713/171 |

OTHER PUBLICATIONS

"Class sun.security.AuthContext", Unknown, 195.212.21.4/system/doc/apidoc/sun.security/AuthContext.html, No later than May 21, 1998, pp. 1–6.

"Class sun.server.http.ServerSecurity", Unknown, www.nada.kth.se/systemgruppen/docs/Jeeves/apidoc/sun-.server.http.ServerSecurity.html, No later than May 21, 1998, pp. 1–2.

Class sun.server.http.ServletSecurity, Unknown, www.nada.kth.se/systemgruppen/docs/Jeeves/apidoc/sun-.server.http.ServletSecurity.html, No later than May 21, 1998, pp. 1–7.

"Distributed Operating Systems", A. Tanenbaum, Prentice Hall, 1995, pp. Cover, Frontispiece, 520–576.

(List continued on next page.)

*Primary Examiner*—Robert Beausoleil
*Assistant Examiner*—Bryce P. Bonzo
(74) *Attorney, Agent, or Firm*—Computer Law[++]

(57) ABSTRACT

Methods, systems, and devices are provided for delegating security rights to Java servlets and other executable tasks by using secure operating system queues. In particular embodiments, the invention allows secure loading of Java servlets on a Novell NetWare server. The invention allows users to run servlets from various locations with the same rights, namely, the user's rights. The servlet submitted by a given user runs in the context of that user's rights. A system according to the invention verifies that the user has the right to submit the task to a given task queue; the queue is managed by the system, and the user is authenticated to the system. Queue servers which receive tasks from the queue and service them by executing the tasks are likewise authenticated by the system. When a queue server attempts to service a task in a queue, the system verifies that the queue server has rights to service that queue and that job. This two way verification—that a user has rights to submit the task, and that the queue server has rights to service the task—allows the user and the queue server to establish a trusted relationship using the operating system's trusted queues. Moreover, existing user rights databases and access control systems can be used to determine and enforce rights and trust levels.

41 Claims, 3 Drawing Sheets

OTHER PUBLICATIONS

"Dynamic Queue's for JAVA—Content server side", Unknown, www.teamunique.dk/dynconts.htm, No later than May 25, 1998, pp. 1–3.

"Interface sun.security,TrustDecider", Unknown, 195.212.21.4/system/doc/apidoc/sun.security.TrustDecider.html, No later than May 21, 1998, pp. 1–2.

"Java Distributed Computing FAQs", Unknown, Sun Microsystems, 1998, pp. 1–3.

"JavaServer Product Group—Access Control Lists", Unknown, jserv.javasoft.com/products/java-server/documentation/toolkit/security/acls.html, No later than May 21, 1998, pp. 1–4.

"JavaServer Product Group—Class sun.security.SimpleTrustDecider", Unknown, Sun Microsystems, Inc., No later than May 21, 1998, pp. 1–2.

"JavaSpace™ Specification", Unknown, SUN Microsystems, Inc., Mar. 17, 1998, pp. 1–6, 1–34.

"Live Products", Unknown, Live Software Inc., 1998, pp. 1–2.

"NetWare System Interface Technical Overview", Unknown, Novell Inc., Jun. 1989, pp. Cover, Frontispiece, 11–1 to 11–19, 15–1 to 15–30.

"NetWare 4 for Professionals", D. Bierer et al., New Riders Publishing, 1993, pp. Cover, Frontispiece, 756–811.

"Novera Management Server", Unknown, www.novera.com/products/nms.htm, No later than May 21, 1998, pp. 1–2.

"Operating System Concepts", A. Silberschatz et al., Addison–Wesley Publishing Company, 1994, pp. Cover, Frontispiece, 431–475, 507–523.

"Role Oriented Secure Delegation for Collaborative JavaBeans", N. Nagaratnam, Syracuse University, No later than May 25, 1998, pp. 1–2.

"Server–Side Java Takes Off", R. Levin, Information Week Online, No later than May 21, 1998, pp. 1–4.

"The Source for Java Technology", P. I. Chang, Sun Microsystems, Inc., No later than May 21, 1998, pp. 1–7.

"Web Realms in the JavaServer", Unknown, Sun Microsystems, Inc., No later than May 21, 1998, pp. 1–5.

"Yahoo!", Unknown, Deja News, No later than May 21, 1998, pp. 1–21.

"Zeus Web Server Key Features", Unknown, Zeus Technology, No later than May 21, 1998, p. 1.

* cited by examiner

AUTHORITY DELEGATION WITH SECURE OPERATING SYSTEM QUEUES

FIELD OF THE INVENTION

The present invention relates to delegation of user authority in a distributed computing environment, and relates more particularly to the delegation of authority to servlets and other distributed computing tasks using secure operating system queues.

TECHNICAL BACKGROUND OF THE INVENTION

Web servers are computers configured to respond to requests from other computers for web pages. A web server may be part of a global computer network, part of an intranet, or part of another network. Various communication protocols may be used, both at lower network levels (TCP/IP, SPX, and so on) and at higher levels (hypertext transfer protocol, file transfer protocol, and so on) in combination with various web page formats (HTML, XML, and so on). Many web sites are primarily linked pages of hypertext and images, but web pages increasingly contain database inquiries, email addresses, and other information that calls for more than the mere presentation of previously specified text and graphics. Accordingly, various attempts are being made to extend the functionality of web servers.

One approach extends web servers to make them capable of running "servlets." Servlets are focused code components (sometimes called "modules" or "plug-ins") which can be added to an existing server with relatively little effort. Each servlet preferably has a well-defined task, such as servicing database requests, sending email, translating IP addresses into domain names, uploading files, posting news group messages, and so forth. Java servlets are portable between platforms by virtue of being implemented in Java bytecodes (JAVA is a mark of Sun Microsystems, Inc.). Indeed, "servlet" is often (but not always) used as a synonym for "Java servlet."

Regardless of the terminology used, many of the security considerations that apply to Java servlets apply to other executable tasks as well. Security is a particular concern when an executable task may be loaded by a server and then run as a separate thread or process to extend the server's functionality by performing a specific job. In addition to Java servlets, such executable tasks include NetWare Loadable Modules and other modules or components implemented in native code, as well as native or Java applications initiated by (or closely coordinated with) the server.

Server security is a concern for several reasons. A server typically has broader access rights than the clients it serves, and the server often runs on behalf of different users at different times. Precautions must be taken to protect the confidential information of the various users. In many systems, servlets run by the server also have broad rights because a thread or other process created by a server process normally has the same rights as the server process. Thus, servlets and similar tasks must either be trusted to the same extent as the server that runs them, or else precautions must be taken to prevent security breaches by such tasks.

The fact that servlets may be loaded dynamically from a source outside the server makes security breaches an even greater concern. The origins and history and behavior of the remote servlet are not necessarily known to the local server administrator. Even if certain origins or behavior are stated for the remote task, such statements might be untrue. Unless suitable precautions are taken, for instance, a malevolent servlet could present itself as a legitimate database update server and then make illicit changes to the database. Or the server might do the job it was called on to do, such as sending and delivering email messages, but do illicit work as well, such as gathering user passwords and periodically mailing them to an unauthorized location.

One general approach taken to improve servlet security imposes a "sandbox" model. All servlets loaded from the server's disk are trusted, and thus have the same security rights as the server itself. By contrast, all servlets loaded from a remote location are untrusted. Untrusted servlets are invoked by a separate instance of the server's dispatcher and they run in a group of untrusted threads which are kept apart from the trusted threads. This means, among other things, that untrusted servlets cannot access the program data and instructions of trusted servlets, so an untrusted servlet cannot gain unauthorized access to system resources by infecting or taking over a trusted servlet. This approach is called a "sandbox model" because one set of servlets gets to play in the sandbox (the server's space) with broad rights or even all possible rights, while other servlets are excluded from the sandbox in the sense that they have very limited security rights.

In addition to the sandbox model, Access Control Lists are used in some systems. An Access Control List ("ACL") is a data structure associated with a system resource and used to control access to the resource. ACLs assume that an authentication method is available to identify users, and they also assume the use of user or group permissions information that reflects the possible ACL settings.

When a user logs onto a system that uses ACLs, the system first uses a login name to identify the user and then uses an authentication means such as a password, biometric scan, ID card, or other means to determine whether the stated identity is correct. When an authenticated user tries to access a resource such as a file, database, email account, printer, or other resource, the system compares the rights of the authenticated user with the rights required to perform the requested access and then allows or denies access accordingly.

In one system using a sandbox model, the server and the trusted servlets which run as threads of the server are either not subject to authentication or else are authenticated to a powerful user such as "root" or "admin." The untrusted servlets run as threads of a separate dispatch process, which is authenticated by the server as a user having relatively high priority for execution but very restricted security rights. In one system, there is a server-wide ACL and separate ACLs can be specified to control access to a specific file, directory, or servlet. Using ACLs to control access to servlets is one way to reduce or prevent unauthorized changes to trusted servlets.

Another general approach taken to improve servlet security requires the servlet to present the server with authenticating credentials before the server will let the servlet run. Credentials may be based on shared symmetric keys, on a public key infrastructure, on digital signatures, on certificates issued by one or more Certification Authorities, or on certificates issued according to a so-called web of trust; in many cases, credentials are based on some combination of these items.

One of the many possible examples of servlet security based on credentials is the sun.security.TrustDecider method is TrustedFor( ), which checks to see whether an entity named in a certificate chain is trusted for a specified purpose. The certificate chain normally includes the servlet certificate, the certificate for the servlet's Certification Authority, the certificate for that Authority's Certification Authority, and so on up to a root Certification Authority's self-signed certificate. Specified purposes may include authenticating a peer through a secured channel or authenticating a specific code signer, for instance.

Unfortunately, both the sandbox model and the use of credentials have serious drawbacks when applied to servlet security. The sandbox model is not very flexible. Although servlets loaded from remote locations must generally be treated with caution, some remote locations, and some servlets, are more trustworthy than others. But a strict sandbox approach makes all remotely loaded servlets equally untrusted. Likewise, the sandbox model violates the principle of least privilege ("each process gets only those privileges its needs to do its legitimate work") by giving every locally loaded servlet full server rights. Even if the locally loaded servers are not malevolent, programming errors may cause problems that would not have occurred if the servlet had only those rights it actually needed to do its job.

Drawbacks of the credential model become apparent when one considers the need to revoke a credential. Revocation may be needed, for instance, when a password has been compromised or when a license to use the servlet has expired. Revocations must be propagated, so they impose overhead. Propagation also takes time, so there may be a significant risk that the revocation will come to a given location too late to prevent authentication of a servlet that should not be authenticated. The necessary and prudent checks to see whether credentials have been revoked also impose overhead costs.

Moreover, a badly planned or implemented credential system can be worse than a simple sandbox model if the flawed credential system creates a false sense of security. Flaws in credential systems may be subtle and hard to overcome. One of the many difficult design issues that must be carefully addressed is illicit use of credentials. Unless adequate precautions are taken, for instance, a malevolent servlet can use credentials stolen or copied from a legitimate servlet to pass itself off as legitimate. Credentials must not only be difficult to forge and easy to revoke, they must also be closely tied to the servlet that is their legitimate owner. These requirements are difficult to meet without imposing overhead costs, both as administrative burdens and as extra processing and storage requirements.

The sandbox and credential models illustrate aspects of two distributed system security procedures, namely, "authentication" and "delegation." Authentication is the procedure a user goes through to establish its identity to the system, while delegation is a procedure that gives one user the security rights of another user.

In a typical sandbox model, for instance, authentication distinguishes mainly between locally loaded servlets and servlets loaded from a remote host. The server then delegates its broad rights to the locally loaded servlets, while the remote host's servlets receive only the narrow rights of a separately authenticated dispatcher instance.

In a distributed system that uses credentials for authentication, one task may lend its credentials to another, in effect delegating all its rights to that task. The delegate task may use the credentials to impersonate the lender task, that is, to be authenticated as the lender task. This form of delegation is very risky unless the delegate is fully trusted, because the set of things the lender (and now the delegate) can do is normally much wider than the set of things the lender (or the delegate) should do.

In spite of the risk, many systems routinely allow one process to temporarily assume to identity of another process, whether the lending credentials or by other means. The UNIX operating system, for instance, has long provided functions such as setuid( ) for setting the user identity, and early versions of the Novell NetWare Queue Management System ("NetWare QMS") provide a ChangeToClientRights( ) call which allows a process servicing a queue to assume the login identity of a client that placed a job in the queue.

On UNIX systems, the risk is reduced by restricting the direction of setuid( ) calls; administrators can use setuid( ) to impersonate regular users, but not vice versa. NetWare QMS reduces the risk by likewise giving administrators greater rights than other users, and also allows limits to be placed on both the set of users who can put jobs in a given queue and the job servers who can service that queue. NetWare QMS may be viewed as a generalization of the sandbox approach, in that the sandbox limits the set of users who can place servlets in the server dispatch queue to the server itself, which in turn only places locally loaded servlets in its dispatch queue. In other ways, however, NetWare QMS is more limited than the sandbox model. NetWare QMS provides neither a general capability for extending server functionality by plugging in local and remote servlets, nor a facility for executing Java bytecodes and other platform-independent executables.

A severely limited form of delegation may be performed when a parent process creates one or more child processes. In many systems, each child process normally receives the parent's security rights. However, this form of delegation requires that the delegate be a child of the delegating process. Likewise, a severely limited form of delegation may occur when a process is cloned by copying state information (or state information and code), either from one address space to another on a single computer or from one computer to another computer. However, this is even more restrictive that the parent-child delegation, since the "child" process is a clone of the parent. Migrating state information across a network link also imposes significant overhead.

Accordingly, it would be an advance to provide a more flexible approach to servlet security and delegation. In particular, it would be an advance to provide an approach to rights delegation which is more flexible and powerful than the sandbox model and known queuing methods, without incurring the overhead of the certificate model.

Such an approach to delegation in a distributed system is described and claimed below.

BRIEF SUMMARY OF THE INVENTION

The present invention provides methods, systems, and devices for delegating security rights to Java servlets and other executable tasks. In general, the invention provides authority delegation in systems with secure operating system queues. In particular embodiments, the invention allows secure loading of Java servlets on a NetWare server (NETWARE is a mark of Novell, Inc.). The servlets can execute on the server with delegated authority from the client that submitted the request being serviced by the servlet.

As noted, Java servlets are presently favored in the industry as a means for dynamically adding features to a back end web server, in spite of the fact that servlets typically load with many or few rights according to the "sandbox" model. Sandbox servlets are either trusted (with many or all rights held by the server) or untrusted (with few or no rights), according to the location from which they are loaded. Thus, only administrators can place servlets on the server itself, since they will be loaded as trusted servlets. Other users must place their servlets on other hosts, to be loaded as untrusted servlets.

The invention provides a more flexible approach to delegation. For instance, the invention allows users to run servlets from various locations with the same rights, namely, the user's rights. The servlet submitted by a given user runs in the context of that user's rights. The invention leverages existing infrastructure such as secure operating system queues and existing operating system user rights databases (including Novell NDS and bindery databases, among others). In particular, existing user rights databases and access control systems can be used to determine and enforce rights, trust levels, and other access controls.

To allow delegation of user rights to servlets and other tasks, a system according to the invention verifies that the user has the right to submit the task to a given task queue. This is possible because the queue is managed by the system, and the user is authenticated to the system. Queue servers which receive tasks from the queue and service them by executing the tasks are likewise authenticated by the system. When a queue server attempts to service a task in a queue, the system verifies that the queue server has rights to service that queue and that job; these rights were granted to the queue server by the administrator during installation of the queue server.

Queue servers are installed by the administrator, but the tasks themselves may be provided by any authorized user. In some embodiments, the tasks and queue servers both run on the same computer as the web server, but other embodiments allow the tasks and queue servers to run on computers other than the web server computer.

The two way verification—that a user has rights to submit the task, and that the queue server has rights to service the task—allows the user and the queue server to establish a trusted relationship using the operating system's trusted queues, the system's authentication mechanism, and the system's access control enforcement mechanism. The user can use the operating system and queue server to securely delegate authority to the task. In particular, this allows a client to submit a Java servlet to an operating system queue and lets the queue server run the servlet with the rights of the client who submitted the servlet.

Familiar authentication techniques can be used with the invention, and existing user rights databases may also be used. Flexible security is provided to run servlets and other executable tasks, from various locations and with various user's rights (including user role rights in some embodiments), without the overhead of delegation through digital certificates that rely on digitally signed code in a certification authority hierarchy. Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to methods, devices, and systems for delegating authority in a distributed computing environment. Suitable distributed environments include local area networks, wide area networks, the Internet, and/or standalone computer systems.

For convenience, definitions of several terms are provided below. These definitions are further refined by discussions and examples located throughout this document.

"Internet" includes variations such as a private Internet, a secure Internet, a value-added network, a virtual private network, an extranet, or an intranet.

A "network" may include one or more LANs, wide-area networks, Internet servers and clients, intranet servers and clients, peer-to-peer nodes, network operating servers and clients, or a combination thereof.

A "computer" may be a workstation, laptop computer, disconnectable mobile computer, server, mainframe, so-called "network computer" or "thin client", personal digital assistant or other hand-held computing device, "smart" consumer electronics device or appliance, or a combination thereof.

A "password" includes one or more individual passwords, pass phrases, biometric scan results (e.g. retinal scan, fingerprint), symmetric key or other cryptographic or digital signature keys, email or other identifying codes, or any other data or device used to protect or control access to an account or another resource in the distributed system.

"User" may refer to an administrator, or it may refer to a non-administrative "regular" user. In either case, a user may be a person or it may be a software task or agent or other computer process acting legitimately on behalf of a person.

Distributed Computing Systems

Figure 1:
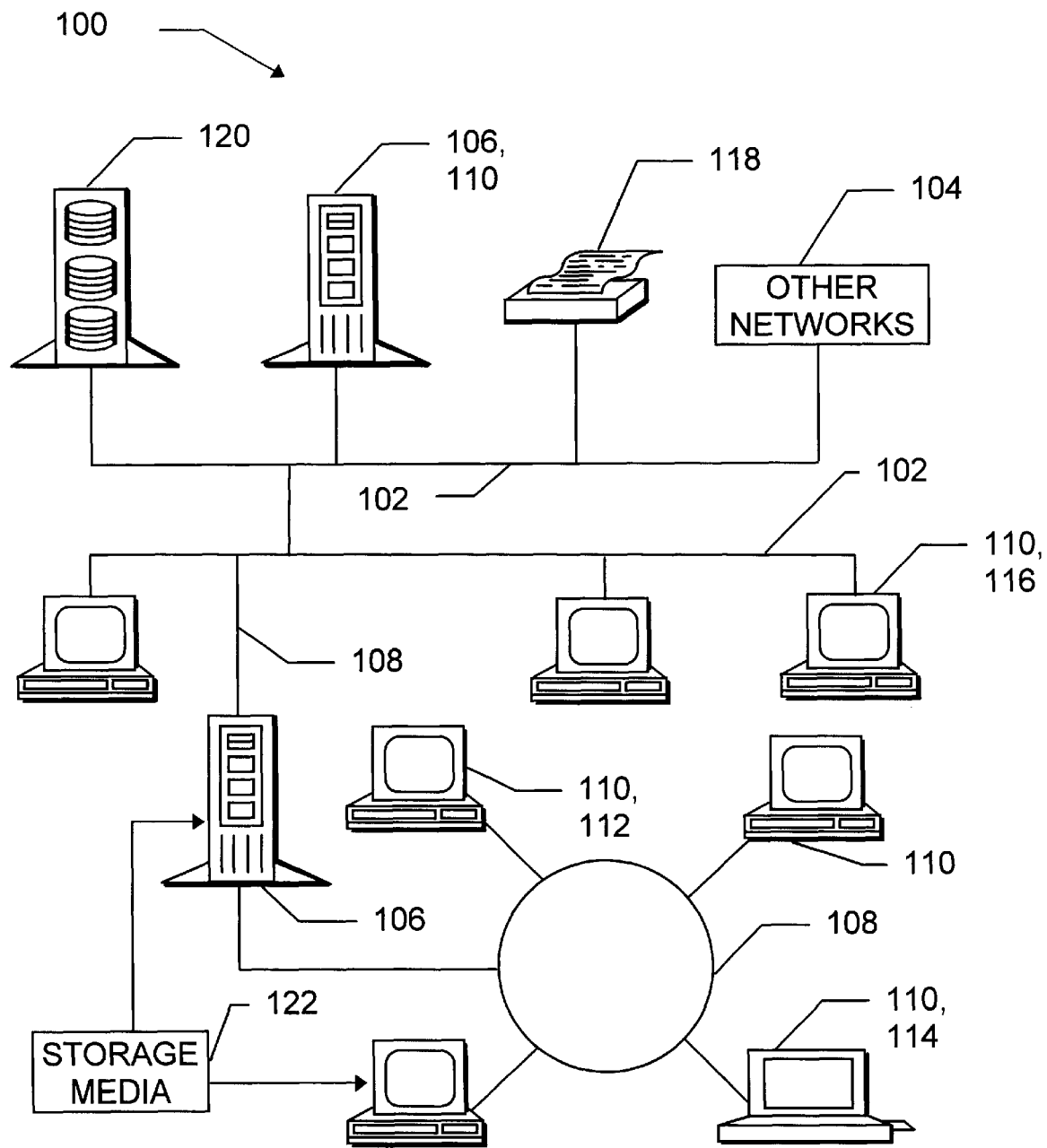
FIG. 1 is a diagram illustrating one of the many distributed computing systems suitable for use according to the present invention.

A portion of one of the distributed computing systems 100 suited for use with the present invention is shown in FIG. 1. In one embodiment, the system 100 includes Novell NetWare® network operating system software (NETWARE is a registered trademark of Novell, Inc.) and Novell Directory Services ("NDS") software. In alternative embodiments, the system 100 lacks NetWare and/or NDS software and includes NetWare Connect Services, VINES, RADIUS, TCP/IP, IPX, NetBEUI, NetBIOS, Windows NT, Windows 98, Windows 95, LAN Manager, and/or LANtastic network operating system software and/or an implementation of a distributed hierarchical partitioned object database according to the X.500 protocol or another directory service protocol such as the Lightweight Directory Access Protocol (VINES is a trademark of Banyan Systems; WINDOWS NT, WINDOWS 95, WINDOWS 98, and LAN MANAGER are trademarks of Microsoft Corporation; LANTASTIC is a trademark of Artisoft). The illustrated system 100 includes two local area networks 102 which are connectable to other networks 104, including other LANs or portions of the Internet or an intranet, through a gateway or similar mechanism. Other embodiments include a single network 102.

As shown, each network 102 includes one or more servers 106 that are connected by network signal lines 108 to one or more network clients 110. The servers 106 and network clients 110 may be configured by those of skill in the art in a wide variety of ways to operate according to the present invention. The servers 106 may be configured as Internet servers, as intranet servers, as web servers, as general file and print servers, as directory service providers, as name servers, as software component or servlet servers, as database servers, or as a combination thereof. The servers 106 may be uniprocessor, multiprocessor, or clustered processor machines. The servers 106 and clients 110 each include an addressable storage medium such as random access memory and/or a non-volatile storage medium such as a magnetic or optical disk, ROM, or flash memory.

Suitable network clients 110 include personal computers 112; laptops, pagers, cell phones, personal digital assistants, and other mobile devices 114; workstations 116; and dumb terminals. The signal lines 108 may include twisted pair, coaxial, or optical fiber cables, telephone lines, satellites, microwave relays, modulated AC power lines, RF connections, and/or other data transmission "wires" known to those of skill in the art. In addition to the network client computers 110, devices such as printers 118 or disk arrays 120 may also be attached to the network 102. A given computer may function both as a client 110 and as a server 106; this may occur, for instance, on computers running Microsoft Windows NT software. Although particular individual and network computer systems and components are shown, those of skill in the art will appreciate that the present invention also works with a variety of other networks, computers, and devices.

The servers 106 and many of the network clients 110 are often capable of using floppy drives, tape drives, optical drives or other means to read a storage medium 122. A suitable storage medium 122 includes a magnetic, optical, or other computer-readable storage device having a specific physical configuration. Suitable storage devices include floppy disks, hard disks, tape, CD-ROMs, PROMs, random access memory, ROM, flash memory, and other computer system storage devices.

The physical configuration represents data and instructions which cause at least part of the computer system 100 to operate in a specific and predefined manner as described herein. Thus, the medium 122 tangibly embodies a program, functions, and/or instructions that are executable by the servers 106 and/or network client computers 110 to perform authority delegation substantially as described herein. Suitable software and hardware implementations according to the invention are readily provided by those of skill in the art using the teachings presented here and programming languages and tools such as Java, Pascal, C++, C, Perl, shell scripts, assembly, firmware, microcode, logic arrays, PALs, ASICs, PROMS, and/or other languages, circuits, or tools.

Architecture

Figure 2:
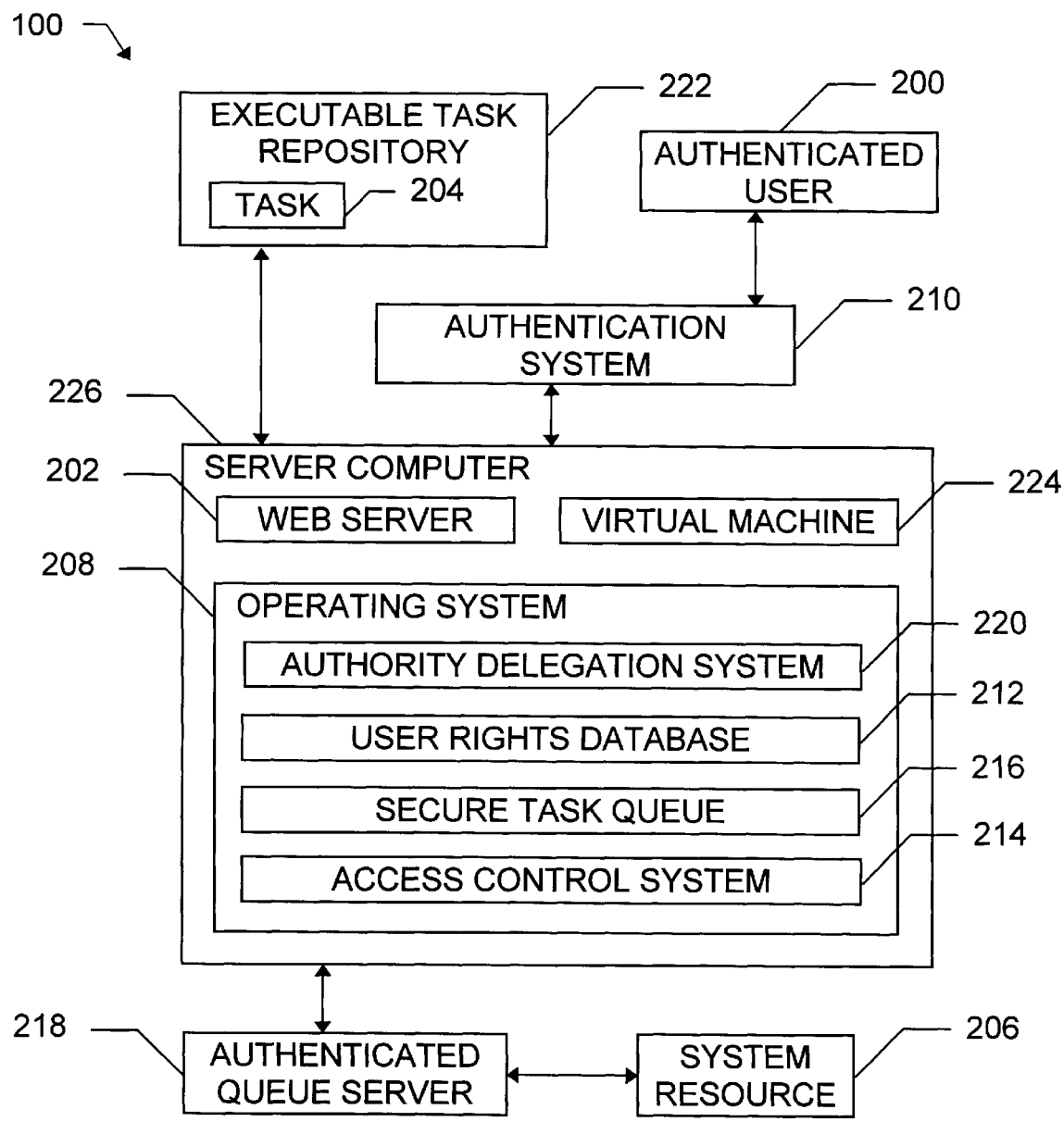
FIG. 2 is a diagram further illustrating an embodiment of the invention in the system shown in FIG. 1.

FIG. 2 illustrates in a block diagram the components of one embodiment of the invention and related components within the distributed system 100. In discussing FIG. 2, reference will also be made to FIG. 1.

An authenticated user 200 wishes to have a web server 202 run a servlet or other executable task 204 on behalf of the user 200. The web server 202 is but one example of a server whose functionality can be extended according to the invention; other servers may be used in other embodiments. Regardless, the task 204 will need access to a system resource 206. The user 200 has security rights sufficient to access the resource 206 and wishes to delegate those rights to the task 204.

The user 200 has been authenticated to an operating system 208 by an authentication system 210. Authentication may be accomplished using a password (as defined above) with means and methods familiar to those of skill in the art.

The operating system 208 may be a distributed operating system, a network operating system such as the Novell NetWare operating system (NETWARE is a mark of Novell, Inc.), a personal computer operating system such as the Microsoft Windows NT operating system (WINDOWS NT is a mark of Microsoft Corporation), or another type of operating system. However, the operating system 208 either contains or coordinates with at least an authentication system, secure task queues, an authority delegation system, and an access control system, as described here, to manage delegation of user security rights to tasks queued by the user.

To the operating system 208, the authenticated user 200 has an identity specified in a user rights database 212. The identity has corresponding security rights, which are typically also specified in the user rights database 212, and which are enforced by an access control system 214. Suitable user rights databases 212 include conventional administrative files defining user accounts and user groups. The user rights database 212 may be integrated with a directory service, such as a Lightweight Directory Access Protocol service, a Novell NDS directory service (NDS is a mark of Novell, Inc.), or other X.500 directory service.

Suitable access control systems 214 include conventional means and methods such as those employed by the Novell NetWare operating system, the Open System Foundation Distributed Computing Environment approach, and operating systems such as the UNIX, MULTICS, and Windows NT systems. Suitable access control systems 214 may employ access control lists, capabilities, groups, permissions, tokens, credentials, and other familiar access control means.

The operating system 208 either contains or coordinates with at least one secure task queue 216. The task queue 216 may be secured in either of two ways. Under one approach, which recalls Novell QMS, only users having sufficient rights can place tasks 204 in the queue 216 and only an authenticated queue server 218 having sufficient rights can remove the task from the queue 216 for servicing. In this case, there is no need to place the user's identity or a security rights specification in the queue 216 with the queued task 204 because the identity and the rights are implicit in the queue 216 itself. For instance, if the queue 216 is dedicated to supervisor tasks, then one must have authenticated "root" or "admin" privileges to enqueue or dequeue a task 204.

A second approach secures the task queue 216 by tying authenticated user identities to queued tasks 204 in the queue 216. Limits may also be placed on which users 200 can enqueue tasks 204 in a given queue 216 and/or on which servers 218 may dequeue tasks 204 from the given queue 216. However, this approach does not require such limits. Instead, an identification of the user 200 is placed in the queue 216 with the task 204 (or in a parallel structure) by an authority delegation system 220 or by the queue 216 manager.

Under either approach, the authority delegation system 220 optionally maintains a list or other record outside the queue 216 showing which user 200 enqueued which task 204, even after the task 204 is dequeued and executed. This list maintains separate identities for the user 200 and the task 204, unlike systems which delegate rights merely by letting one process assume another process's identity. Thus, if the access control system 214 detects an attempt by the task 204 to access a system resource 206 to which the user 200 has no access right, the authority delegation system 220 can inform the operating system that the unauthorized access attempt was not made directly by the user 200 but was made instead by the delegate task 204.

The executable tasks 204 may reside in a repository 222. Suitable repositories include file system directories and files following predetermined naming conventions; Novell NDS repositories; repositories having a registry such as a Microsoft registry; repositories having a component server or library manager; and other repositories of the type used to organize, store, track, and retrieve COM or DCOM components, Java servlets and applets, shared applications, *.DLL or *.O or other software component files.

The web server 202 and/or the authenticated queue server 218 may access an existing virtual machine 224, or may spawn or otherwise create such a virtual machine. Depending on the format and content of the executable code in the task 204, the virtual machine may include a Java virtual machine for interpreting Java byte codes, another virtual machine for interpreting Forth or LISP or BASIC or another interpreted programming language, or an interface to special-purpose software or hardware such as graphics engines, array processors, clusters, manufacturing devices, or the like.

The web server 202 and virtual machine 224 are shown residing on a server computer 226. However, those of skill in the art will appreciate that various components of the system 100 may reside on various combinations of clients and servers while still operating according to the invention.

In some embodiments, for instance, the user 200 is on a client computer, while the operating system 208, user rights database 212, access control system 214, secure task queues 216, and authenticated queue servers 218 all reside on another computer, namely, the server computer 226. The user 200 communicates with the operating system 208 over an authenticated network connection. In a conventional sandbox model, queue servers somewhat analogous to the servers 218 would typically have full rights, just like the operating system 208. In a system 100 according to the invention, however, it is not necessary to give the queue servers 218 full rights or no rights based on their location. Instead, a given server 218 may have different rights while processing tasks for different users 200; the queue server 218 is delegated the rights of a given user 200 while processing tasks 204 on behalf of that user 200.

Other embodiments are similar to those just described, but the authenticated queue servers 218 reside on one or more computers distinct from both the user 200 computer and the operating system 208 computer. In a conventional sandbox model, queue servers somewhat analogous to the servers 218 would typically have few or no rights because of their untrusted status due to their location on a distant host. In a system 100 according to the invention, however, the queue servers 218 receive rights based on rights of the user 200 whose task is presently being processed. These rights are not necessarily based on the queue server's location or the initial location of the task 204.

Methods

Figure 3:
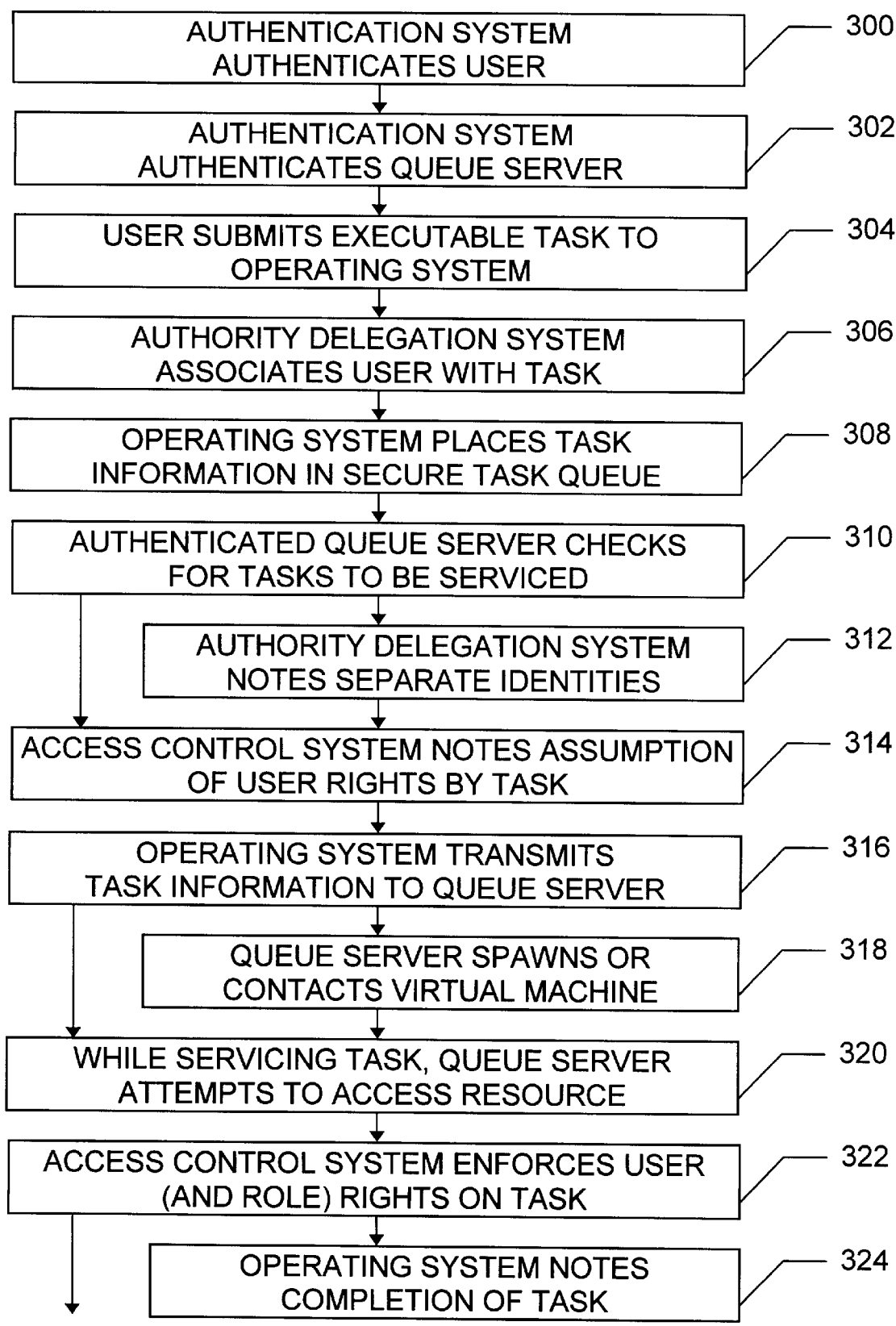
FIG. 3 is a flowchart illustrating methods according to the present invention.

With continued reference to FIGS. 1 and 2, we turn now to FIG. 3, which illustrates methods of the present invention. For ease of illustration, method steps are shown in FIG. 3 even if they may be omitted from some claimed methods. In practice, steps may be omitted unless called for in the claims, regardless of whether they are expressly described as optional in this Detailed Description.

Likewise, the steps are shown in a particular order even though they may be performed in other orders or concurrently, except when one step requires the result of another step. For instance, the user 200 and the queue server 218 may be authenticated in the order shown, in the opposite order, or in an overlapping (concurrent) manner.

Steps may also be repeated, even though the repetition is not shown expressly. For instance, an authenticated queue server 218 may check a task queue 216 more than once before a task 204 is placed in the queue 216 where it can be recognized by the queue server 218.

In addition, those of skill in the art will recognize when descriptions provided in connection with one step also pertain to another step, thereby making explicit repetition of the description unnecessary. For instance, the various ways of transmitting a queued task 204 to a queue server 218 provide examples showing the task 204 might be placed in the task queue 216 before transmission to the queue server 218. Steps may also be named differently. Finally, observations analogous to those above for method steps apply to the elements of system or storage medium claims.

During a user authenticating step 300, the authentication system 210 authenticates the user 200 for access to the system 100. During a similar queue server authenticating step 302, the authentication system 210 authenticates the queue server 218 to the system 100. Each authenticating step 300, 302 first obtains information such as account number (s), user name(s), or other internal identifying information to determine which account(s) are involved. If the user 200 requesting access is an administrator, one or more accounts may be changed. If the user 200 is a regular user, then typically only that user's individual account will be involved (although different roles may be allowed within that account).

The authenticating steps 300, 302 obtain sufficient information, such as an account password, data from a magnetic card, data from a biometric scan, and/or certificate or other credential, to determine that the user 200 or queue server 218 requesting access is entitled to the user identity it seeks. Suitable certificates include certificates issued by a Certification Authority. A Certification Authority may be a dedicated and/or centralized certification authority of the type found in a public key infrastructure, or it may be an alternative certification authority such as a member of a PGP (Pretty Good Privacy encryption infrastructure) or other web of trust. Authentication methods and tools are well-known in the art, at least with respect to their use in authenticating individual users 200.

During a submitting step 304, the user 200 submits an executable task 204 to the operating system to be serviced, that is, to be executed on behalf of the user 200 if possible. Suitable tasks 204 include Java servlets, Java applets, platform-independent applications such as applications written in Java, Perl, OpenGL, shell script, or another language which has virtual machines or interpreters implemented in multiple operating systems, a native code application tailored to a specific operating system and/or specific computer hardware, or another collection of executable code possibly supplemented with data. Suitable executable codes includes object code, linked object code, linked and loaded object code, interpretable code, Java bytecodes, and other computer program codes.

During an associating step 306, the authority delegation system 220 associates the user 200 with the task 204 submitted by the user 200. This may be done by creating or updating a task control block, linked list element, table entry, or other data structure that ties the user 200 identity (and possibly the user's current role if roles are supported) to the task 204 identity. Suitable user 200 identifiers include distinguished names, login names, account numbers and/or other user identifiers known in the art. Suitable task 204 identifiers include process IDs, indexes into a list of tasks, full path names, uniform resource locators, instruction pointers, memory addresses, and/or other task identifiers known in the art.

During a placing step 308, the operating system 208 effectively places the task 204 in the secure task queue 216 by placing task-related information in the queue 216. Placing the task 204 may include placing all information needed to execute the task 204, including user 200 identity and all executable code and required start-up data in the queue 216. However, the task 204 may also be placed merely by placing in the queue an URL or address or other sufficient information for the queue server 218 that services the task 204 to obtain the rest of the necessary information.

For instance, one method places in the queue 216 a resource locator identifying the location of executable code of the task 204. One resource locator is a Uniform Resource Locator ("URL") specifying the domain name of the repository 222 and the path to a file containing the task 204 on the repository 222 computer. Another resource locator identifies a chain or tree of classes already loaded in memory in a client 110. Another resource locator includes a distinguished name, GUID, UUID, or tuned name for locating the task in a partitioned hierarchy using a directory service.

User identifications may also be placed in the task queue 216. User identifications may be in the same form as the entries in the user rights database 212 or as portions of such entries. A user identification in the queue 216 may also be an index or pointer into the database 212.

During a step 310 the queue server 218 checks the queue 216 to determine if any tasks 204 have been queued and need to be serviced. The queue server 218 may poll the operating system 208 periodically to check for tasks 204. Alternatively, the queue server 218 may check for a task 204 only in response to predetermined events such as completion of a previous task 204, or the receipt of an interrupt or message or other signal from the operating system 208 that was generated when a task 204 was placed in the queue 216. Like the authenticated user 200, the authenticated queue server 218 normally uses an authenticated network connection if the queue server 218 and the queue 216 reside on different computers in a network.

During an identity-noting step 312, the authority delegation system 220 notes the separate identities of at least the queued task 204 and the user 200 who submitted that task 204. If an attempt is made to violate access controls, the separate identifications noted by the authority delegation system 220 provide sufficient information to distinguish between user 200 and delegate (task 204) identities, allowing the access control system 214 to catalog the task 204 as a delegate of the identified user 200. Responsibility for the unauthorized access attempt will thus be assigned to the task 204 rather than the user 200.

If multiple servers 218 service the queue 216, then the identity of the particular queue server 218 that services the task 204 may also be noted by the authority delegation system 220 to provide helpful details when tracking software defects or malicious attacks on system security. Likewise, if the user 200 is allowed to act under more than one role (with or without corresponding different security rights) without logging out and logging into a different account, then the role responsible for submitting the task 204 is noted by the authority delegation system 220.

As indicated in FIG. 3, some embodiments omit step 312, so the task 204 effectively assumes the user's identity while executing. Even in such embodiments, however, it may be possible to distinguish between access attempts made directly by a user 200 and access attempts made by a task 204 submitted by the user 200. For instance, the user 200 process may be suspended awaiting results from the task 204, or the task 204 may run on a computer not ordinarily used by the user 200.

During a delegation-noting step 314, the access control system 214 notes the assumption of user 200 security rights by the task 204. This may be done, for instance, by creating an identity for the task 204 in the user rights database 212 listing the task 204 as a "user" whose rights are the same as those of the user 200 (the database 212 entry may also specify the user 200 as the "source" or "delegator" from which the task received the rights). Procedures such as setuid( ) may also be used.

During a transmitting step 316, the operating system 208 transmits the task 204 to the queue server 218. Like the placing step 308, this transmitting step 316 may be accomplished in various ways, both as to the specification of executable code and as to the specification of the user 200.

One transmitting step 316 serializes Java classes stored in a first computer's memory and sends the serialized classes to another computer's memory. The first computer may be either the server computer 226 on which the task queue 216 is kept, or a repository computer 222. For instance, URLs and class names might be used in the queue 216 to specify classes that are already loaded in the repository computer's memory.

Another transmitting step 316 sends the queue server 218 a resource locator identifying the location of executable code of the task 204 which has not been loaded for execution and has thus has no executable task state information. Another transmitting step 316 sends the queue server 218 a stream of executable bytecodes (again without execution state information), either from the server 226 or from a repository 222 computer.

As noted, the queue server 218 may execute on a different computer than the task queue 216, so the transmitting step 316 may include sending information (about the task 204 and possibly also about the user 200) to the queue server 218 across a network signal line 108.

During a step 318, the queue server 218 either connects with or creates a virtual machine process after determining that a virtual machine is needed to execute the transmitted task 204. For instance, if the task 204 includes a Java servlet, Java applet, or Java application, then a Java virtual machine will be needed to execute the task 204. It may be the case that a virtual machine is already running. For instance, embodiments which include a web server 202 running Java servlets either directly or indirectly on behalf of users 200 will often include a Java virtual machine, either as an integral part of the web server or as a separate process.

However, the queue server 218 may not, in general, simply submit the Java portion of the task 204 to an existing Java virtual machine for execution. Care must be taken to ensure that the Java virtual machine will execute the task 204 with the delegated security rights. This will generally be the case if the Java virtual machine was spawned to process an earlier task 204 on behalf of the same user, or if the Java virtual machine is tailored to the present invention so it recognizes and operates with delegated rights. Alternatively, the queue server 218 may run its own virtual machine as a child process which inherits the rights of its parent, namely, the delegated rights of the user 200.

Some tasks 204 may use only processor cycles and their own memory, making it unnecessary to guard against unauthorized accesses. But in general, the task 204 will perform at least one step 320, and possibly many such steps, in which it attempts to access system resources 206 other than a processor and assigned memory. For instance, the task 204 may attempt to read a certain file, to write certain database records, to open a connection with another network 104, to suspend or kill another process, or to otherwise try to influence the security and/or integrity of the system 100. The user 200 will generally have the necessary rights to take such actions, because tasks 204 will generally be "well-behaved" rather than malicious or dangerously erroneous.

On occasion, however, the user 200 will not have the right to perform the attempted access. The access control system 214 recognizes the task 204 as having the same rights as the user 200, although not necessarily the same identity. Accordingly, an enforcing step 322 will prevent access by the task 204 when such access would not be allowed if attempted directly by the user 200. Suitable actions may be taken in response to unauthorized attempts, such as logging the attempts, notifying administrators by email, suspending the task 204, issuing warnings, and/or terminating the task 204. Access control may use access control lists, permissions, groups, credentials, and other familiar security mechanisms.

During a step 324, the operating system 208 may note or be informed of the completion of the task 204. Subsequent attempts by the queue server 218 to operate on behalf of the user 200 may then be prohibited unless the user 200 submits another task 204 to the queue 216 and thence to the queue server 218.

Means for performing the various method steps include computers configured with software or special-purpose hardware to accomplish the functions described. By way of example and in addition to those above and not by way of limitation, means for authenticating users include keyboards and other means for obtaining passwords; means for submitting or placing tasks include memory transfers, disk reads, and other data transfer mechanisms; means for transmitting tasks include network transmission protocols, "wires," routers, and the like; and means for performing various functions include software written in Java, C++, or other languages, operating to control microprocessors and other computer hardware.

Conclusion

The present invention provides improved tools for authority delegation in a distributed computing system. Unlike the conventional sandbox model for servlets, the invention allows servlets from various locations to run with rights that are enough, but no more, than those needed to do the job for the user. Unlike conventional approaches that associate rights certificates with code through digital signatures, existing user rights databases can be used to define the security context for tasks submitted by users. Tasks can be readily canceled or otherwise invalidated, without tracking down and revoking potentially widespread digital certificates. The overhead involved in digital signatures, certificate generation, certificate verification, and certificate revocation, is also avoided, because both parties—the client submitting the task, and the queue server executing the task—trust the operating system and other system components involved as intermediaries.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods. As used here, the term "includes" means "includes, without limitation" or "comprises," rather than meaning "consists of."

The invention may be embodied in other specific forms without departing from its essential characteristics. The described embodiments are to be considered in all respects only as illustrative and not restrictive. Any explanations provided herein of the scientific and organizational principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for delegating user authority in a distributed computer system, the method comprising the steps of:

associating an authenticated user of the distributed computer system with an executable task submitted for execution by the authenticated user, the authenticated user having security rights enforced in the computer system;

placing the executable task in an operating system queue;

transmitting the queued executable task to an authenticated queue server for execution, wherein the transmitting step comprises serializing classes stored in a first computer's memory and sending the serialized classes to another computer's memory; and delegating user rights to the task by enforcing the authenticated user's rights on the task.

2. The method of claim 1, wherein the associating step comprises placing an identification of the user in the queue with the task.

3. The method of claim 1, wherein the placing step comprises placing a Java servlet task in an operating system queue.

4. The method of claim 1, wherein the placing step comprises placing a Java applet task in an operating system queue.

5. The method of claim 1, wherein the placing step comprises placing a platform-independent application task in an operating system queue.

6. The method of claim 1, wherein the placing step comprises placing a native code application task in an operating system queue.

7. The method of claim 1, wherein the transmitting step comprises sending the queue server a resource locator identifying the location of executable code of the task.

8. The method of claim 1, wherein the transmitting step comprises sending the queue server a stream of executable bytecodes.

9. The method of claim 1, wherein the transmitting step comprises sending the queue server information across a network signal line.

10. The method of claim 1, wherein the delegating step comprises executing at least part of the executable task and execution of the task is managed by the queue server.

11. The method of claim 10, wherein the executing step comprises spawning a virtual machine to interpret bytecodes of the task.

12. A distributed computer system comprising:

a user database correlating user identities with corresponding rights;

an access control system for enforcing user rights by comparing the rights of a user seeking access to a system resource with the rights needed to access the resource and allowing access only if the user has sufficient rights;

a user authentication system for authenticating users, the database and access control system and authentication system cooperating such that the access control system gives a user the rights corresponding to a user identity in the user database if the authentication system associates the user with that user identity;

a secure queue that associates authenticated remote users with tasks they submit to the queue, the tasks containing executable code;

an authenticated queue server for servicing the queue, the queue server capable of executing at least part of a task submitted to the queue; and an authority delegation system which associates a submitting remote user's identity with a task submitted by the remote user, thereby permitting the access control system to enforce the identified remote user's rights on the task while the task is being serviced by the queue server, wherein the authority delegation system maintains separate user and delegate identities and the access control system catalogs the task as a delegate of the identified user.

13. The system of claim 12, wherein the user database comprises a directory service.

14. The system of claim 12, wherein the access control system comprises access control lists.

15. The system of claim 12, wherein the user authentication system comprises a credential checker for checking a credential issued by a certification authority.

16. The system of claim 12, wherein the queue is managed by a network operating system.

17. The system of claim 12, wherein the queue server comprises a Java virtual machine.

18. The system of claim 12, wherein the user database and the access control system define roles, such that a user may assume different roles having different security rights while the user is logged in on a single user account.

19. The system of claim 12, wherein a task submitted by a user is stored in a repository in a location identified by a resource locator.

20. A computer storage medium having a configuration that represents data and instructions which will cause at least a portion of a computer system to perform method steps for delegating authority from a user, the method comprising the steps of:

providing a secure queue that associates remote users with tasks they submit to the queue;

placing in the queue an executable task submitted by an authenticated remote user, the authenticated remote user having security rights which are enforced by an access control system, the executable task identifying executable code;

executing at least part of the executable code of the task, execution of the code being managed by the queue server; and delegating user rights to the task by enforcing the authenticated remote user's rights on the task during its execution, wherein the delegating step maintains separate remote user and delegate task identities.

21. The configured storage medium of claim 20, wherein the providing step provides a queue managed by a network operating system.

22. The configured storage medium of claim 20, wherein the placing step comprises placing a platform-independent task in an operating system queue.

23. A method for delegating user authority in a distributed computer system, the method comprising the steps of:

associating an authenticated user of the distributed computer system with an executable task submitted for execution by the authenticated user, the authenticated user having security rights enforced in the computer system;

placing the executable task in an operating system queue;

transmitting the queued executable task to an authenticated queue server for execution; and delegating user rights to the task by enforcing the authenticated user's rights on the task, wherein the delegating step maintains separate remote user and delegate task identities.

24. The method of claim 23, wherein the associating step comprises placing an identification of the user in the queue with the task.

25. The method of claim 23, wherein the placing step comprises placing a Java servlet task in an operating system queue.

26. The method of claim 23, wherein the placing step comprises placing a Java applet task in an operating system queue.

27. The method of claim 23, wherein the placing step comprises placing a platform-independent application task in an operating system queue.

28. The method of claim 23, wherein the placing step comprises placing a native code application task in an operating system queue.

29. The method of claim 23, wherein the transmitting step comprises serializing classes stored in a first computer's memory and sending the serialized classes to another computer's memory.

30. The method of claim 23, wherein the transmitting step comprises sending the queue server a resource locator identifying the location of executable code of the task.

31. The method of claim 23, wherein the transmitting step comprises sending the queue server a stream of executable bytecodes.

32. The method of claim 23, wherein the transmitting step comprises sending the queue server information across a network signal line.

33. The method of claim 23, wherein the delegating step comprises executing at least part of the executable task and execution of the task is managed by the queue server.

34. The method of claim 33, wherein the executing step comprises spawning a virtual machine to interpret bytecodes of the task.

35. A distributed computer system comprising:

a user database correlating user identities with corresponding rights;

an access control system for enforcing user rights by comparing the rights of a user seeking access to a system resource with the rights needed to access the resource and allowing access only if the user has sufficient rights;

a user authentication system for authenticating users, the database and access control system and authentication system cooperating such that the access control system gives a user the rights corresponding to a user identity in the user database if the authentication system associates the user with that user identity;

a secure queue that associates authenticated remote users with tasks they submit to the queue, the tasks containing executable code;

an authenticated queue server for servicing the queue, the queue server capable of executing at least part of a task submitted to the queue; and an authority delegation system which associates a submitting remote user's identity with a task submitted by the remote user, thereby permitting the access control system to enforce the identified remote user's rights on the task while the task is being serviced by the queue server;

wherein the user database and the access control system define roles, such that a user may assume different roles having different security rights while the user is logged in on a single user account.

36. The system of claim 35, wherein the user database comprises a directory service.

37. The system of claim 35, wherein the access control system comprises access control lists.

38. The system of claim 35, wherein the user authentication system comprises a credential checker for checking a credential issued by a certification authority.

39. The system of claim 35, wherein the queue is managed by a network operating system.

40. The system of claim 35, wherein the queue server comprises a Java virtual machine.

41. The system of claim 35, wherein a task submitted by a user is stored in a repository in a location identified by a resource locator.

* * * * *